Oct. 14, 1947.    H. R. DENTON    2,428,837
MACHINE FOR MAKING BAGS
Filed Oct. 16, 1943    9 Sheets-Sheet 1

INVENTOR.
HARVEY R. DENTON
BY Boyken, Mohler & Beckley
ATTORNEYS.

Oct. 14, 1947.  H. R. DENTON  2,428,837
MACHINE FOR MAKING BAGS
Filed Oct. 16, 1943  9 Sheets-Sheet 2

INVENTOR.
HARVEY R. DENTON
BY Boykin, Mohler & Beckley
ATTORNEYS.

Oct. 14, 1947.                H. R. DENTON                2,428,837
                           MACHINE FOR MAKING BAGS
                         Filed Oct. 16, 1943        9 Sheets-Sheet 8

INVENTOR.
HARVEY R. DENTON
BY
Boykin, Mohler & Beckley
ATTORNEYS

Oct. 14, 1947. H. R. DENTON 2,428,837
MACHINE FOR MAKING BAGS
Filed Oct. 16, 1943 9 Sheets-Sheet 9

INVENTOR.
HARVEY R. DENTON
BY
Boyken, Mohler & Beckley
ATTORNEYS.

Patented Oct. 14, 1947

2,428,837

UNITED STATES PATENT OFFICE 2,428,837

MACHINE FOR MAKING BAGS

Harvey R. Denton, San Francisco, Calif., assignor to Moist-R-Proof Container Co., San Francisco, Calif., a corporation of California Application October 16, 1943, Serial No. 506,505

8 Claims. (Cl. 93—18)

This invention relates to a machine for making bags, envelopes, or the like, from paper or paper-like material.

One of the objects of the invention is an improved machine that is adapted to rapidly and to automatically make relatively flat bags or envelopes of various sizes from paper or paper-like material fed in sheet form from a source of supply, such as from a roll or rolls of the material.

Another object of the invention is an improved machine adapted to make bags of paper or paper-like material from a strip or strips of such material, and which machine is provided with means for sealing the adjacent edges or marginal portions of the opposite sides of such bag as the material is fed through the machine and to cut the strip or strips transversely of its movement through the machine without stoppage of such movement for forming bags of the desired size.

A still further object is the provision of a machine adapted to make multi-walled bags as quickly and rapidly as single-walled bags that can be made on the same machine, and which machine is adapted to secure adjacent walls of such multi-walled bags together as a unit.

An additional object of the invention is an improved machine adapted to make bags from paper or paper-like material with a slip-sheet automatically positioned in each bag between opposite walls thereof along the lines where otherwise there might be a tendency for opposed walls or sides of the bags to stick together, and which slip-sheets are fed between the opposed sides of the bag from a roll and are automatically cut into sections and the sections are automatically spaced apart to enable sealing of the opposed sides of the respective bags along one of their edges.

Another object is an improved method of continuously making bags from a roll or rolls of paper or paper-like material including the steps of cutting the material of the rolls and the manipulation of the material in a manner that is believed to be new and novel.

Other objects and advantages will appear in the description and in the drawings annexed hereto.

In explanation of the term "paper-like material," this is intended to include such material as chlorinated rubber and regenerated cellulose as well as other sheet material suitable for making bags. This machine is particularly suitable for material that can be sealed or fused together by heat, or where paper requires an auxiliary adhesive to effect sealing, the conventional glue pots may be used instead. However, certain improvements in means for heat-sealing are included in this invention; hence it is to be understood that where such means is specifically defined in the claims, the conventional means for sealing is not the equivalent of the means specifically defined.

Briefly described, heretofore the size of machine-made bags or envelopes has been relatively limited, and extra large bags have been difficult, if not impossible to make. Therefore, a machine that is adapted to make bags of a large variety of sizes from small ones to extra large ones, is very desirable.

Where extra strong, tightly sealed bags have heretofore been attempted, the general practice has been to use relatively heavy sheet material, but this involves difficulties, both as to folding and to sealing. Also in some desirable materials the gage of the material is limited. These problems have been overcome by this invention without sacrifice of speed by making provision for making multi-walled bags in which adjacent pairs of walls are sealed together.

In the past the use of slip-sheets, particularly in the type of bags that are heat-sealed, has been expensive and slow and in many instances impossible. With this invention the slip-sheets are properly positioned and cut to proper size so as not to interfere with the sealing operation, and this is accomplished with no sacrifice in speed or at any expense other than the cost of the slip sheets.

The term "paper" as hereinafter used, will include paper-like material adapted to be heat-sealed, such as regenerated cellulose, more commonly known as "Cellophane" and chlorinated rubber, more commonly known as "Pliofilm." Other trade-names are used for similar materials.

Figures 1, 28:
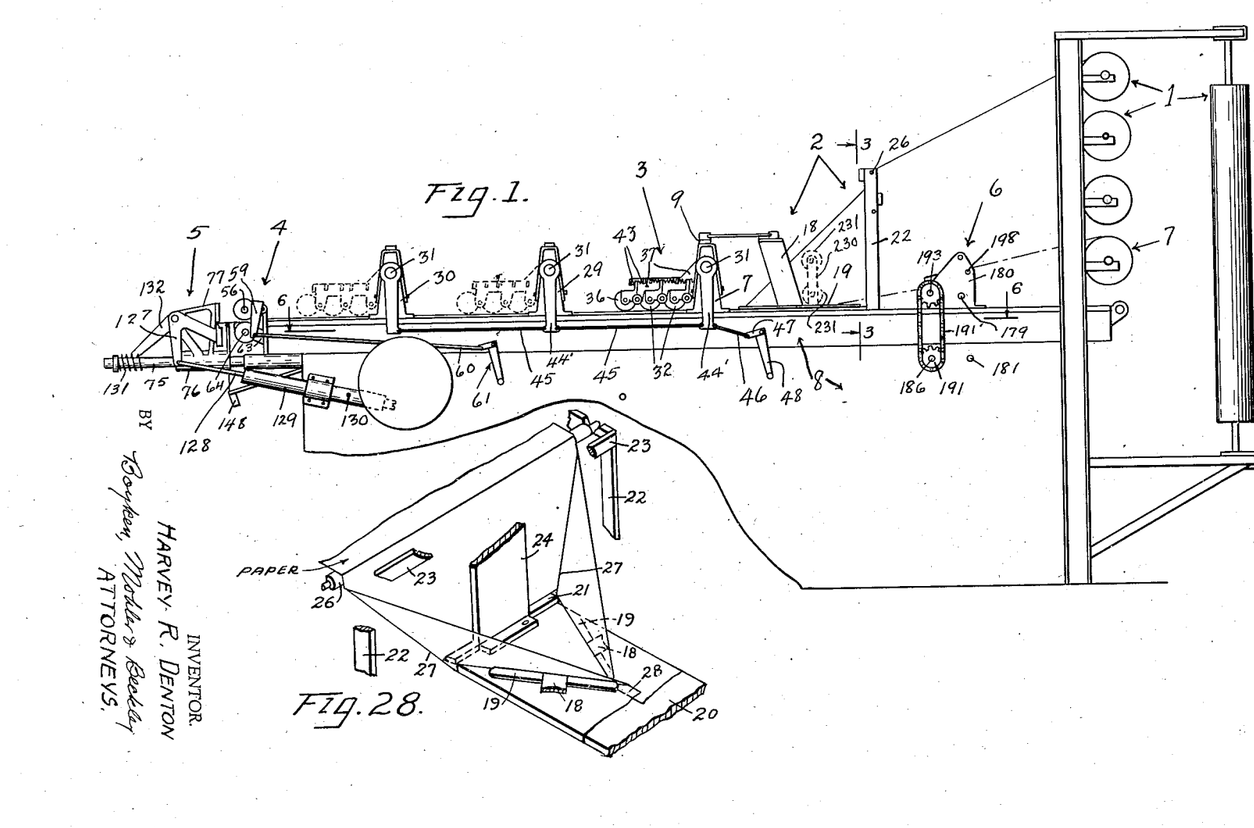
Fig. 1 is a side elevation view of the machine, certain heating elements that may be optional for use being indicated in dash lines.
Fig. 28 is a semi-diagrammatic perspective view of the folding device, certain parts being broken away and in section.

In general, referring to Fig. 1, one or more rolls 1 of the paper are adapted to be rotatably supported at the feed end of the machine. In most instances these rolls are supported horizontally, but in some instances they may be vertical, as indicated.

Where the paper from a roll is to be folded on itself, it may pass over a folding device generally indicated at 2, after which the folded sheet passes under one or more sealing devices 3, and then between drive rollers 4 to a reciprocating cutting device 5 that may also carry heat sealing members.

In those instances where a slip-sheet is employed, a combined slip-sheet feed mechanism and cutter 6 near the feed end of the machine functions to intermittently cut sheets from a roll on the machine and pulls the paper from the roll at intervals sufficient to space the cut sheets in the bag material so as to enable transverse sealing of the latter material between spaced adjacent ends of the slip-sheets, as will be later described more in detail.

The above mechanisms will be later described in detail, but their general identification at this time, together with a brief description of the manner in which the machine functions with and without the slip-sheet mechanism will be helpful to a better understanding of the invention.

The folding device 2 merely functions to cause the paper from one or more of the rolls to be folded or doubled over longitudinally of the strip or strips coming from said rolls so as to seal the desired overlapped portions along edges of the sheet or sheets. Broadly speaking, paper folding devices of generally the character shown herein are old, and various kinds are used to accomplish various folds.

The sealing devices 3 press overlapped portions of the folded strip together against a supporting plate, and as said devices are heated, the overlapped portions will be heat-sealed together as the paper moves past said devices.

The drive rollers 4 function to keep the sheet of bag material moving continuously from the rolls past the folder 2 and sealer 3. When the said material comes to rollers 4 it is in the form of a flattened tube, and after the flattened tube moves past rollers 4 it goes between a cutter 5 that is actuated intermittently to cut off the flattened tube transversely thereof, and heating elements are associated with the cutter 5 for sealing the tube at one or both sides of cutter 5, according to whether the bag is to be a side opening type or an end opening type.

It is particularly pertinent to this invention that this transverse cutting of the folded over strips or strip and the sealing along one or both sides of the line of the transverse cut be done as the paper moves along longitudinally of the strip fed from the machine and at a speed of movement equal to the speed produced by the feed rollers 4.

By varying the interval of time between successive actuations of the sealer and cutter 5, it will be seen that various length bags may be formed, since a shorter interval of time would produce a shorter bag and a longer interval will produce a longer bag.

When the slip sheet feed device is used, a strip of slip sheet material is fed by rollers on device 6 to between opposite sides of the folded material that form the opposite sides of the bag. This slip sheet material may be drawn from a roll, as indicated at 7, at the feed end of the machine, and it is ordinarily relatively cheap paper since its purpose is to prevent the sticking together of the opposite side walls of the bag. This use of the slip sheet is not restrictive however.

When the bag material folded by the folder devices at 2 leaves the latter it is in the form of a continuous strip or flat tube which must be cut off transversely to bag length and sealed along one of the sides of each cut to close one end of each section so cut. The slip-sheet material cannot extend between the sides of each bag at the end to be so sealed, therefore the slip-sheet material is intermittently cut by the cutter at 6, and each section so cut from the strip of slip-sheet material is spaced from the section adjacent thereto. The feeding and cutting of the slip-sheet material is synchronized with the feeding and cutting of the bag material so that the space between adjacent pairs of sections cut from the roll of slip-sheet material will substantially correspond with the width required along one end edge of each bag to enable sealing the sides of the bag at such end by the sealer 5 that is at the discharge end of the machine.

In many instances, as where the material for forming the bags is sealed along one or both of the opposite edges of the opposite sides of the bag, the slip-sheet is not required, since the sealing of the bag material is at no point where there is any possibility of the opposite sides of the bag's sticking together in undesirable places.

The foregoing description is general and the following description is more in detail, taking up each of the elements of the machine in series from the feed end thereof, commencing with the folders 2.

The folding device 2

Figures 2, 3:
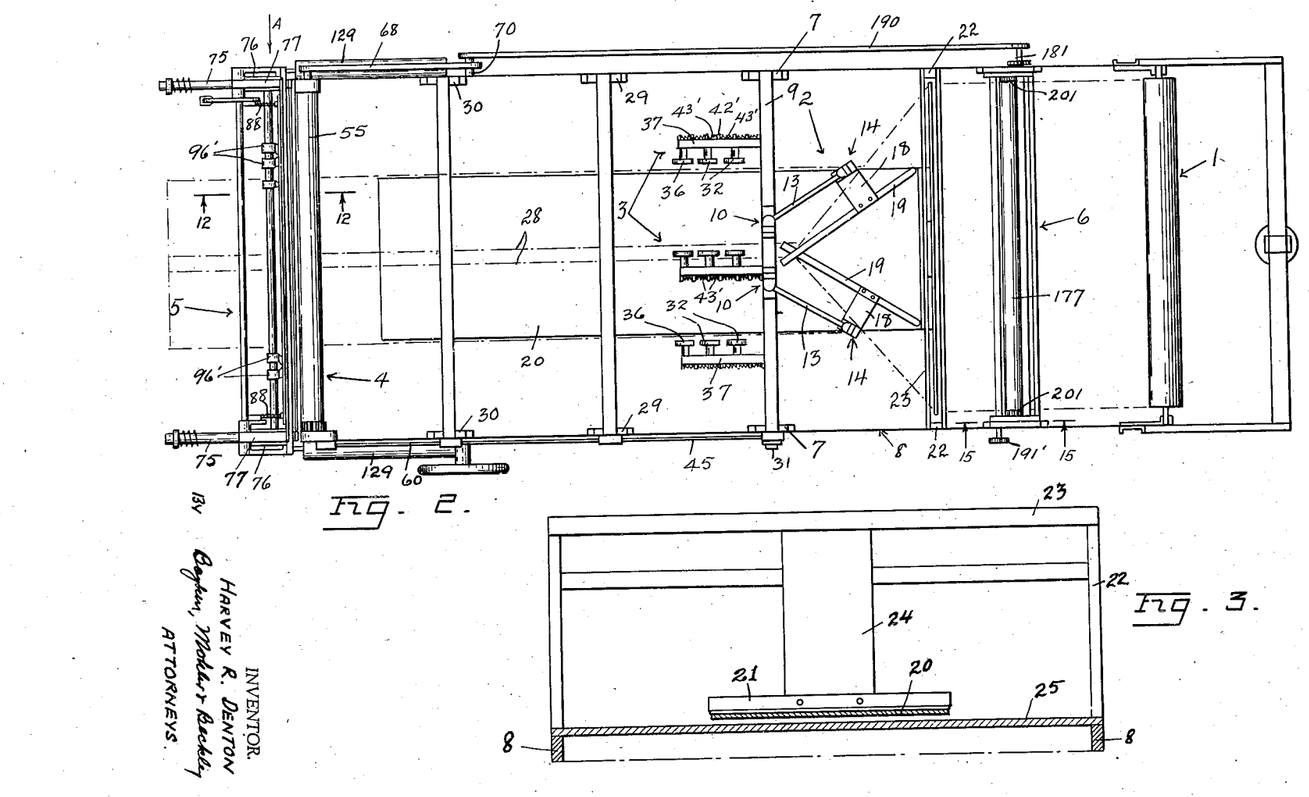
Fig. 2 is a plan view of the machine. The sheet material being fed through the machine is indicated in dot-dash lines.
Fig. 3 is an enlarged, vertical sectional view of part of the machine as seen from line 3—3 of Fig. 1.

This device is indicated in Figs. 1, 2, 3, 8 and 9 and comprises a pair of posts 7 secured to the frame 8 of the machine adjacent opposite sides thereof. A cross bar 9 is supported on the upper ends of the posts and extends transversely across the machine (Fig. 2). On cross bar 9 is a pair of housings 10, or gear supports, each supporting a rotatable worm gear 11 (Fig. 9) in mesh with a gear 12, the latter being supported for rotation about a vertical axis. To each gear 12 is secured one end of an arm 13, the latter projecting from said gear generally toward the end of the machine carrying rolls 1.

The arms carried by the gears 12 in the respective housings 10 are shown in Fig. 2 as extending divergently toward the feed end of the machine, and each arm 13 carries a housing or gear support 14 on its outer end like housings 10. Each arm 13 is secured at its outer end to a gear 15 that is in mesh with a worm gear 16. These gears 15, 16 are like gears 11, 12.

Each gear 15 carries an arm 17 projecting laterally therefrom, and on the outer end of each arm 17 is a depending arm 18 that carries a horizontally extending strip 19 at its lower end that may extend substantially parallel with the arm 13 that carries each such strip. These strips 19 are parallel with the upper side of a horizontal folding board or plate 20 that extends below said strips and longitudinally of the machine to a point adjacent the discharge end of the machine.

The convergent ends of strips 19 extend one over the other and spaced apart where they cross a sufficient distance for the bag material to easily slide between them and over the upper side of plate 20 centrally of the width of the latter.

Between the divergent ends of strips 19 and the feed end of the machine is a vertical plate 24 which plate is supported by posts 22 on the machine at opposite sides of the machine. A cross bar 23 extending between the upper ends of posts 22 carries the plate 24 which in turn carries a horizontal strip 21 at its lower end. Strip 21 is secured to one end of the horizontal plate 20 supporting the latter spaced above the upper side 25 of the machine (Fig. 3).

The paper or paper-like material from roll 1 is brought over a horizontal strip or roller 26 that extends between the upper ends of posts 22 and then extends downwardly over the side of plate 24 that faces roller 1 and under the strip 21 and plate 20. The marginal portions of the strip of paper from roll 1 are folded over the upper side of the plate 20 to overlapping relation centrally of said plate by reason of strips 19. The length of strip 21 is substantially the same as the width of plate 20, and said strip 21 is positioned centrally of the paper passing over roller 26 so that the ends of the strip 20 terminate distances inwardly of the edges of said paper equal to the widths of the marginal portions of the paper that are adapted to fold over the plate 20. Thus as the marginal portions are drawn over plate 20 to overlapping relation, the ends of said strip 21 causes a bending of the paper along lines 27 that extend convergently upwardly from the ends of strip 21 to the edges of the paper that are adjacent the ends of roller 26, as best seen in Fig. 28, and in which the paper is shown in full line and is labeled.

While this system of folding is generally old, the provision of the gears in housings or supports 10, 14 at the ends of arms 13 is thought to be new, and enables the folding of a strip of bag material as above described, or by turning either the worm gears 11, or 16, or both, may different foldings of bag material be quickly effected for different bags and different sized bags without removing the strips and substituting others.

Figure 17:
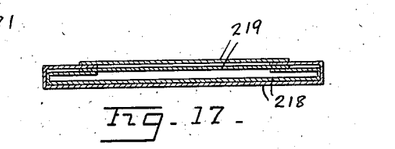

As one example, two or more strips of bag material may be simultaneously fed through the machine in which only a relatively narrow marginal portion along each longitudinally extending edge of the strip passing under plate 20 may be folded over the marginal portions of plate 20, and the strip from another of said rollers 1 may be fed over the top of plate 20 without folding of any portion thereof, but so that the opposite marginal portions of the latter strip are between plate 20 and the over folded marginal portions of the first mentioned sheet or the marginal portions of the unfolded upper strip may lie over the folded marginal portions of the other strip. Fig. 17 shows such a bag where two upper and two lower strips respectively forming opposite sides of the bag are formed.

Plate 20, of course, would be changed for a wider bag, but the strips 19 and their mountings do not need to be changed, although they may be adjusted.

After the strip of bag material has passed the folding device 2, and has its overlapping portions over the upper side of plate 20, as indicated by the dot-dash lines 28, the said overlapping portions pass between the sealing devices 3 and the plate 20.

Sealing devices 3

The particular sealing devices illustrated are for use in heat-sealing the bag material, it being understood that the latter is on the order of regenerated cellulose, chlorinated rubber, or other material adapted to to be heat-sealed.

In Figs. 1, 2 and 20 to 24 the sealing devices or separate elements thereof are shown. Several pairs of posts similar to posts 7, such as are indicated at 29 and 30 may be used, and posts 7 themselves may be used, as shown in Fig. 1.

A rotatable rod 31 extends between each pair of posts 7, 29, 30 and on each rod is secured one or more sets of the type of sealing devices shown in Fig. 1, each set including one or more rollers 32 having an electrical heating element 33 (Figs. 21, 22) and transformer 35 (Fig. 21), and also heat control means 34.

The sealing rollers 32 and a cooling roller 36, which latter may be of any desired material, such as quartz or of metal, are arranged in tandem in direction longitudinally of the machine, with the cooling roller 36 nearest the discharge end of the machine.

Figures 20, 23, 24:
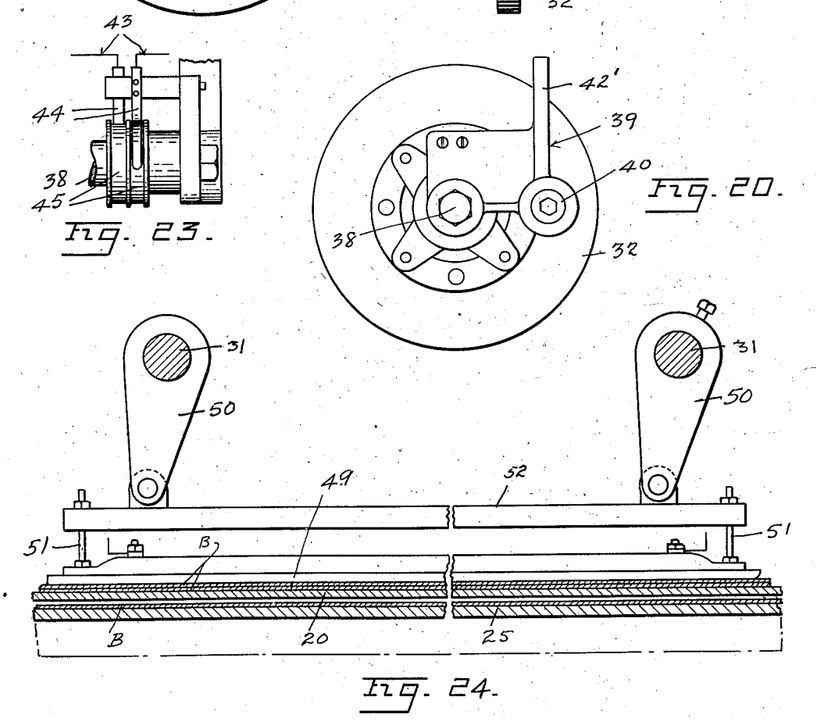
Fig. 20 is an elevational view of one of the heating elements or rollers.
Fig. 23 is a fragmentary elevational view of part of the heating mechanism of Fig. 20.
Fig. 24 is a different form of heating element than that shown in Figs. 20 to 23 and one that may be substituted for the latter for certain work.
Figure 21:
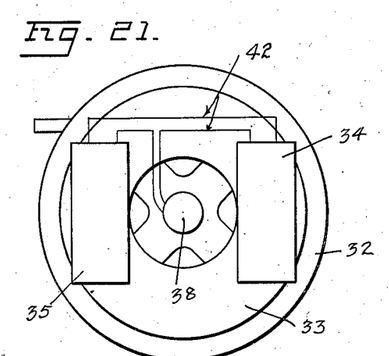
Fig. 21 is a semi-diagrammatic elevational view of the opposite side of the roller of Fig. 20.
Figure 22:
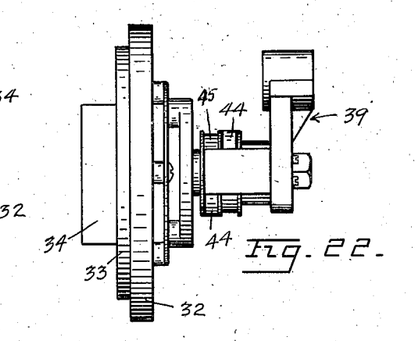
Fig. 22 is an edge view of the roller of Fig. 20.

These rollers are carried on a frame 37 in said tandem relation, each roller itself being secured on a shaft 38 for rotation about the axis of the latter, and which shaft is secured to the end of the base arm of an L-shaped bracket 39 that is rotatably supported at the juncture of its arms on a pivot 40 that is carried by the frame 37 (Figs. 1, 20).

The heating element, transformer and heat control device are in an electrical circuit 42 (Fig. 21) that is supplied with current from wires 43 (Fig. 23) that are respectively connected to fingers 44 that are in sliding contact with conductor rings 45 carried on shaft 38. Suitable electrical insulation is provided between bracket 39 and the pivot 40 and fingers 44, and shaft 38 may likewise be insulated from roller 32 to insure proper conduction of current to the heating element.

The vertical leg 42' of the brackets 40 of each adjacent pair thereof in a set are yieldably held in position by springs 43' so that the rollers of each set will be yieldably urged in a downward direction against the overlapped margins of the bag material, so as to press against such margins, but said spring will permit the rollers to be yieldably raised independently of each other in the event of any irregularities in the surface against which they are adapted to press against.

There may be several frames 37 on each rod 31, and as already stated, there may be several of said rods.

At one end of each rod 31 is secured one end of an arm 44', there being a similar arm for each of rod 31. The opposite ends of arms 44' are connected by links 45 (Fig. 1), and one of the end arms 44' has a link 46 connecting said end arm to one leg 47 of crank that is pivotally supported on the frame of the machine. The other leg 48 of the crank carries a handle. Thus, upon swinging the crank on its pivot in one direction the frames 37 will be swung to lower the rollers 32, 36 against the bag material to be sealed, while swinging of the crank in the opposite direction will lift all of the frames 37 and rollers thereon clear of such material. Any suitable and conventional locking device (not shown) may be used to releasably hold the crank in a position with the rollers on frames 37 clear of the material to be sealed.

The use of a plurality of sealing rollers 32 on each frame 37 insures a proper sealing of the overlying parts of the bag material, and the cooling roller 36 on each frame cools the seal after the sealing operation. It is obvious that any number of frames and rollers may be carried on each rod 31, and said frames are adjustable relative to each other on each rod so as to bring one or more sets of rollers over the desired point above the plate 20 or above top 25 of the machine outwardly of the side edges of said plate.

Modified form of sealing device

In Fig. 24 is a modified form of one of several similar sealing devices that may be substituted for each set of rollers. In this form, each heating element is in an elongated, narrow shoe 49 that is adapted to slidably engage the bag material longitudinally of the overlapped portions, which shoe is pivotally secured at its ends to hangers 50 that are respectively secured to an adjacent pair of the cross rods 31. The connection between the shoe and hangers may include posts 51 projecting upwardly from the ends of each shoe 49, and which posts slidably extend through openings in the ends of a bar 52, which bar in turn carries lugs 53 that are directly pivoted to the hangers. Thus, upon lowering the shoe on the material to be heat-sealed, the shoe may "float" up and down on posts 51, while the heads on the posts 51 that are above bar 52 will engage the bar upon rotation of rods 31 and the shoe will be lifted from said material. The crank for rotating the rods remains the same as where the rollers are used.

After the bag material passes the sealers generally designated 3, and as above described, it is in the form of a flattened tube enclosing the plate 20. The end of plate 20 that is remote from its supporting plate terminates adjacent the drive rollers 4, said latter rollers being the ones that draw the bag material past the folder device 2 and sealers 3.

Drive rollers 4

Figure 5:
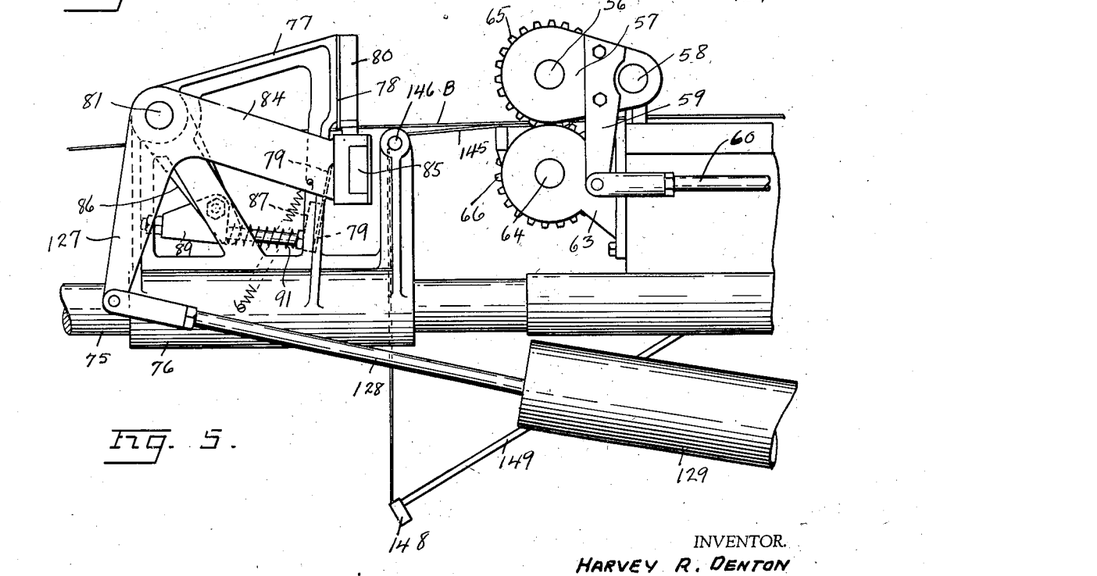
Fig. 5 is an elevational view of the part shown in Fig. 4.

These drive rollers are parallel, and are disposed one above the other. The upper roller 55 of said pair has coaxial shaft extensions 56 at its ends that are rotatably supported in brackets 57 (Fig. 5). Brackets 57 are pivoted at 58 to a stationary part of the machine at aligned points offset to one side of the axis of the roller 55 for swinging of the roller upwardly away from the roller therebelow. An arm 59 is secured to at least one of said brackets and projects downwardly therefrom. Said arm is pivotally connected at its lower end to one end of a generally horizontally extending rod 60. The opposite end of rod 60 is pivotally connected to the end of one arm of a crank 61 (Fig. 1) that is provided with a handle for rotating the crank and thereby moving the rod 60 to lift the roller 55 from the roller 62 that is therebelow.

Roller 62 is the driving roller of the pair and the bag material B is fed between the two rollers for frictional engagement thereby and for pulling or drawing said material under the sealing elements previously described. Stationary brackets 63 are journalled for extensions 64 of the shaft carrying the roller.

At one of their corresponding ends the pair of rollers 55, 62 have gears 65, 66 (Fig. 5) respectively secured thereto, said gears being adapted to mesh with each other when the rollers are in driving relation relative to the bag material B that is between them. Said gears separate upon actuation of the crank 61 for separating the rollers, hence to stop the feeding of bag material between the rollers it is merely necessary to separate them by actuating the crank, although the drive roller 62 may continue to rotate.

Figure 6:
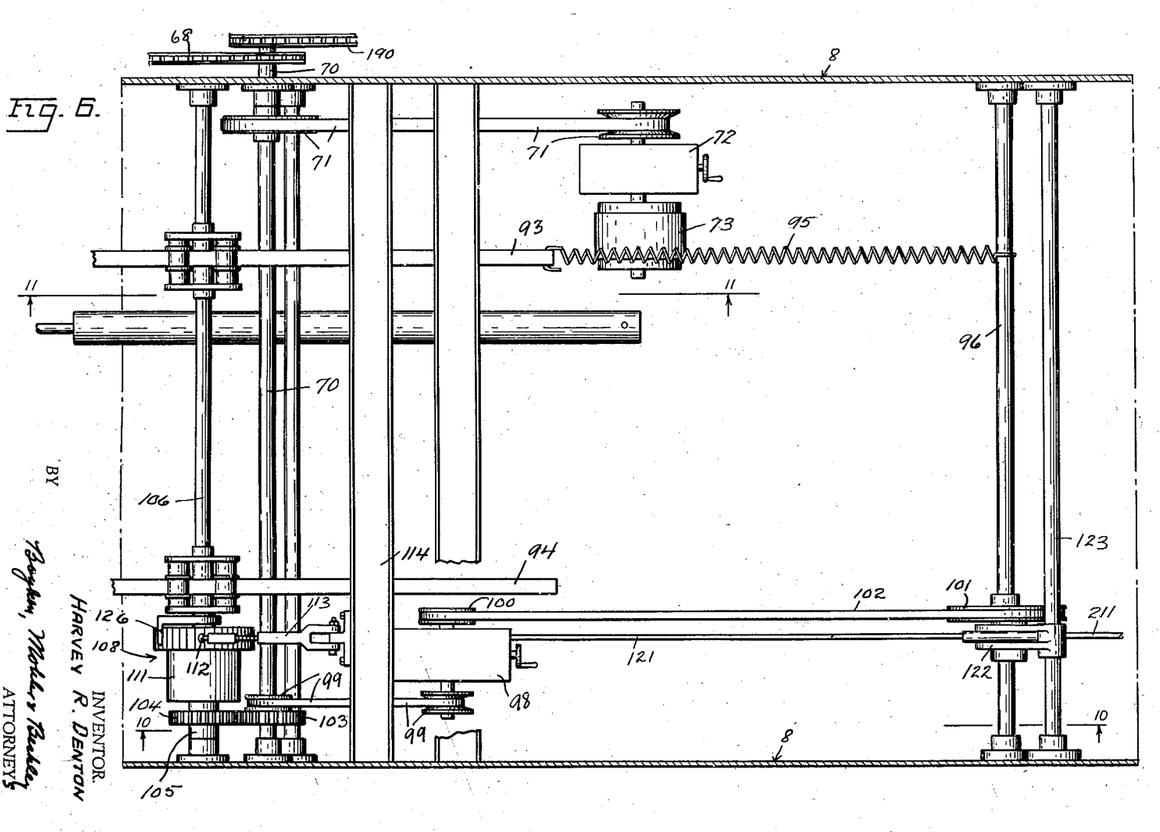
Fig. 6 is a fragmentary sectional view of a portion of the machine at the bag discharge end thereof as seen from line 6—6 of Fig. 1.
Figures 11, 12, 13:
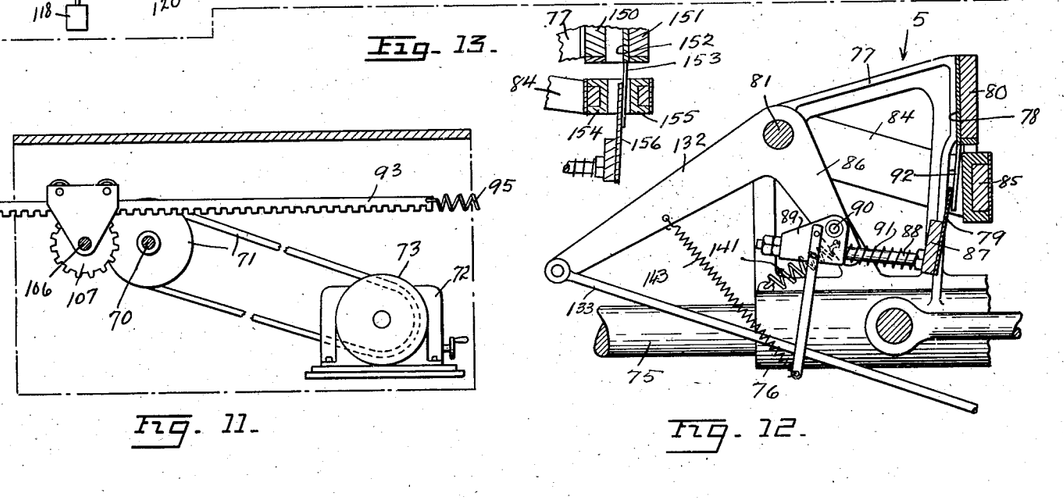
Fig. 11 is a part sectional, part elevational view of a portion of the machine as seen from line 11—11 of Fig. 6.
Fig. 12 is an enlarged, fragmentary sectional view of the cutter and sealer as seen from line 12—12 of Fig. 2.
Fig. 13 is an enlarged fragmentary sectional view of a slightly different form of sealer than is indicated in Fig. 5.

The drive for roller 62 comprises a sprocket 67 secured to one of the end extensions 64 (Fig. 7) and a similar sprocket on a drive shaft 70 (Figs. 2, 6) that are connected by sprocket chain 68. The drive shaft 70 is driven by a belt-pulley connection 71 with a variable speed changer 72 that is connected with the drive shaft of a conventional motor 73 (Figs. 6, 11).

The lifting of the upper roller 55 may be accomplished independently of the lifting of the sealing devices 3, or the rod 60 may be connected with rod 45, if desired, so as to make this lifting operation of the roller 55 and said sealing devices simultaneous. Only mechanical ingenuity would be required to make such connection.

Reciprocating cutting device 5

At the foot of the machine and at the lateral side of the pair of rollers 55, 62 that is opposite the sealing devices 3 is the device generally designated 5. This device is ordinarily a combination sealer and cutter.

In operation, the sealing device 3 functions to seal overfolded or overlying bag material in a direction that is parallel with the strip drawn from one or more of the rolls 1. Thus, a flattened tube of such material will pass between rollers 55, 62 for feeding to the cutting and sealing device that is generally designated 5. This device functions to cut off the flattened tube at intervals in a direction transversely thereof, and to seal one or both of the cut ends adjacent the cutter, according to the type of bag to be formed, as will later be described.

Referring to Figs. 1, 2, it will be seen that a pair of parallel bars 75 project horizontally from the foot end of the machine, and which bars are generally in about continuation of the sides of the machine. These bars are rigidly connected at one of their ends to the frame of the machine, and function to support thereon a carriage that carries the cutter blades and sealing elements.

This carriage on bars 75 comprises a pair of bearings 76 (Figs. 1, 2, 4, 5) that are reciprocable on said bars. Each of said bearings carries an upstanding frame member 77 rigid therewith. Between members 77 extends a flat, elongated cutting blade 78 that is stationary relative to said frame members, and which blade 78 is adapted to cooperate with an elongated knife blade 79 adjacent thereto for cutting the bag material B that extends between said blades when the cutting edge of blade 79 moves in a shearing stroke past the shearing edge of blade 78. The mounting of blade 79 for such movement will be later described.

Figure 4:
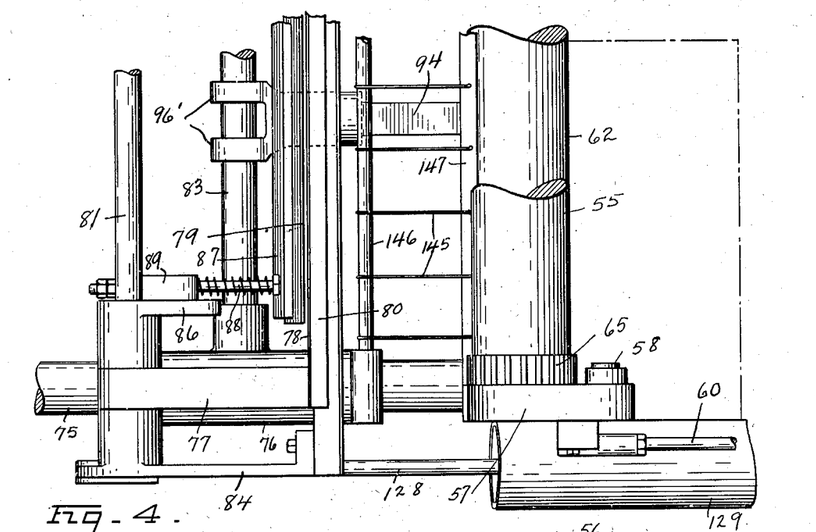
Fig. 4 is an enlarged, fragmentary plan view of part of the machine adjacent the discharge end thereof.

Alongside blade 78 and secured stationary relative thereto is an anvil member 80, which member extends between the frame members 77 and is secured thereto. While the blade 78 and anvil member 80 may materially contribute to the rigidity of the carriage that is reciprocable on bars 75, the frame members are also connected by a shaft 81, and furthermore, there are aligned bosses on bearings 76 respectively that support a cross-shaft 83 therebetween (Fig. 4).

The cross shaft 81 is rotatable at its ends in bearings in frame members 77 and has an arm 84 secured to each of its ends and projecting laterally therefrom. The ends of an elongated heating bar 85 that carries therein electrical heating elements are respectively secured to the outer ends of arms 84. Thus, upon rotating shaft and said shaft and bar are so positioned that the heating bar 85 will swing upwardly into engagement with the anvil member 80 upon such rotation of shaft 81 in one direction. When bag material B is fed between the knives it also passes between member 80 and bar 85, the former being alongside blade 78, hence when the shaft 81 is rotated to cause the heating bar 85 to move into engagement with the anvil member, the opposed sides of the bag material will be gripped between said bar and member and will be heat-sealed together. Of course the anvil member may have electrical heating elements therein as well as the bar 85, if desired.

The blade 79 is also carried on shaft 81, there being arms 86 rotatable at one of their ends on said shaft and the blade being carried on the outer ends of said arms.

Fig. 12 most clearly shows the knife 79, it being secured along one edge to a rigid reinforcing bar 87. A pair of parallel rods 88 are respectively secured at one of their ends to bar 87 projecting at about right angles from said bar. Each rod 88 slidably extends through a block 89 that is pivoted at 90 to each arm 86 while a spiral spring 91 around each rod 88 reacts between the blade and each block 89 to yieldably urge the blade 79 against guides 92 that are adjacent the ends of said blades. These guides 92 are strips in downward extension of the ends of stationary blade 78, and extend generally tangentially of the arc through which the ends of arms 86 and rods 88 are adapted to move when the arms and rods are swung about the axis of shaft 81. This mounting of the blade 79 on arms 86 will permit the blade to move axially of the rods 88 against the expansion of springs 91 as the blade 79 slides on guides 92 toward blade 78 for shearing the bag material B (Figs. 5, 12).

The swinging of the blade 79 and sealing bar 85 is effected by reciprocable movement of the carriage on bars 75. Certain connections between the arms 84, 86, and other parts of the machine coact with the reciprocation of the carriage for causing the swinging of said blade 79 and bar 85. These connections will later be described after the means for moving the carriage itself is explained.

*Drive means for carriage*

The carriage that supports the blades 78, 79 and the anvil 80 and heating bar 85 is reciprocated through the medium of a pair of parallel racks 93, 94. The rack 93 has a tension spiral spring 95 connecting one of its ends with a shaft 96 that is supported at its ends in the sides of the machine frame (Fig. 6). The opposite end of rack 93 and the correspondingly positioned end of rack 94 are respectively connected at 96' (Figs. 2, 4) to cross bar 83.

As already explained, the shaft 70 is driven by motor 73 through the belt pulley connection 71 and variable speed changer 72. The shaft 70 in turn drives a variable speed changer 98 through a belt pulley connection 99 (Figs. 6, 10) and the driven shaft of the speed changer 98 carries a pulley 100 that is connected with a pulley 101 on cross shaft 96 by a belt 102 for rotating the shaft 96 at any desired speed.

On shaft 70 is also secured a gear 103 that is in mesh with a gear 104 (Figs. 6, 10), the latter being secured on a hollow shaft 105 that is rotatable on a shaft 106, the latter being rotatably supported at its ends in bearings carried by the frame of the machine. Secured on shaft 106 are gears 107 that support racks 93, 94 and with which gears the teeth of the racks are in mesh.

The hollow shaft 105 that carries gear 104 is always rotating when drive shaft 70 is actuated, and this rotation is continuous when the machine is being operated. The speed of rotation is dependent upon the adjustment of the variable speed changer 72, and as the shaft 70 is also connected with the drive roller 62, it is seen that these are synchronized.

A clutch mechanism generally indicated at 108 (Fig. 6) is for connecting shafts 105, 106 in driving relation, and for releasing shaft 106 at predetermined intervals after each connection. This clutch mechanism is conventional in itself, and comprises a ratchet wheel 109 that is adapted to be intermittently stopped by a pawl 112. Pawl 112 is movable into and out of engagement with the ratchet teeth of wheel 109. When ratchet wheel 109 is stopped by the pawl, the shaft 106 is connected with shaft 105 for rotation of the latter in a direction for moving the racks 93, 94 in a direction for carrying the cutter and sealer carriage away from rollers 55, 62. As soon as the pawl 112 is released from engagement with the ratchet wheel, the racks are free to return to a position restoring the carriage to its place adjacent rollers 55, 62, and are so returned by means of spring 95. The clutch housing 111 and ratchet are rotatable relative to said shafts and by differential gearing within the housing 111 which includes concentric main bevel gears respectively on shafts 105, 106 and auxiliary bevel gears carried by the housing on radial axes that connect said main gears (not shown), the driving of shaft 106 and its release is accomplished upon stopping and releasing the ratchet wheel 109.

Wheel 109 is adapted to be stopped by the spring pressed pawl or stop 112 (Fig. 6), which pawl is secured to one end of the arm 113. The other end of arm 113 is pivotally secured to cross frame member 114.

A link 115 is pivotally connected at one end to arm 113 and the other end of said link is pivotally connected to one arm 116 of the head of a generally T-shaped crank, while the opposite arm 117 carries a counterweight 118 thereon. A pivot 119 supports the said crank at the juncture of said arms with the depending leg 120 of the crank for pivotal movement of the arms 116, 117 generally vertically.

Along generally horizontally extending link or rod 121 slidably extends at one end thereof through the leg 120 and springs on said end at opposite sides of said leg yieldably hold the crank in any desired position relative to said rod.

The opposite end of rod 121 is pivotally connected to one end of a link 122 that is supported on cross shaft 123 for pivotal movement about the axis of said shaft. The said link 122 extends over cross shaft 96 and rides like a cam follower on cam 124 that is secured to said shaft 96.

In operation, upon revolution of shaft 96 by motor 73 through the transmission and speed changer 98 which is connected to shaft 96 by the belt pulley connection 100, 101, 102, the cam 124 will be revolved. As the link 122 is supported against said cam the latter will be swung in one direction as the high side of the cam engages it, and when so swung the stop or pawl 112 is moved to engage the teeth of the ratchet wheel 109, stopping the latter and connecting shafts 105, 106 for rotating together. This rotation causes rotation of gears 107 that are respectively in mesh with the teeth of racks 93, 94, thus actuating said racks for moving the carriage that carries the cutting and sealing device 5 outwardly away from the feed device generally designated 4.

The pawl 112 is released from engagement with ratchet wheel 109 by means of an arm 126 carried on shaft 106, which arm lifts the pawl from the ratchet wheel at one point in the revolution of the arm, thus disconnecting shafts 105, 106 for return of the carriage to its starting position.

The speed changer 72 is preferably regulated to rotate the drive roller 62 (drive device 4) at the same surface speed as the speed at which the carriage for the cutter and sealer 5 is moved though the gear and rack connection. However, as the speed changer 98 regulates the rotation of cam 124, it will be seen that the interval between actuations of the rack gears 107 for moving the carriage may be longer or shorter as desired. If the speed of rotation of the cam is regulated to cause pawl 112 to stop the ratchet wheel 109 (and to thereby actuate gears 107) only a short time after arm 126 has released the previous engagement between the pawl and ratchet wheel, then much shorter sections of bag material B will be cut by the cutting knives on the reciprocating carriage than would be cut were a longer interval to elapse between the actuations of gears 107. This is regulated by the speed changer 98 during operation of the machine.

*Means for actuating cutter and sealer on carriage*

The power for actuating the cutter blade 79 and sealing bar 85 is derived from the motor 73 although rather indirectly.

The arms 84 that carry the sealing bar 85 are virtually the corresponding arms of bell cranks supported for swinging on the axis of shaft 81, and the other arms 127 of such cranks are pivotally connected at their outer ends to the outer ends of piston rods 128. These rods have pistons respectively pivotally connected to their opposite ends, said pistons being reciprocable in cylinders 129 (Figs. 1, 4, 5, 7). Air is admitted to the cylinders outwardly of the pistons through restricted orifice 130. The piston-cylinder connections with the bell crank arms 127 thus function to provide sufficient resistance to movement of the pistons in the cylinders as the carriage is moved outwardly to swing the sealing bar into clamping the bag material between said bar and the anvil. The initial pressure of the sealing bar may be relatively firmer than later pressure as the carriage reaches the end of its outward stroke, which is all a matter of where the orifices 130 are positioned and their size. Springs 131 may be on the outer ends of bars 75 to provide a cushion for the carriage at the end of its outward movement, and a conventional check valve may be in the head of each cylinder 129 to provide for a relatively fast release of air in the cylinders upon the return of the carriage under the influence of springs 95, although at the final end of the return stroke the pistons and cylinders function as conventional dash pots, once the pistons have passed the orifices 130 (Fig. 1), the latter being the main ones for reducing the suction created between the pistons and cylinder heads.

The movement of the knife 79 is almost simultaneous with movement of the sealing bar, although the cutting action is preferably slightly before the bar 85 has clamped the bag material against the anvil 80.

Figures 7, 8, 9, 9A:
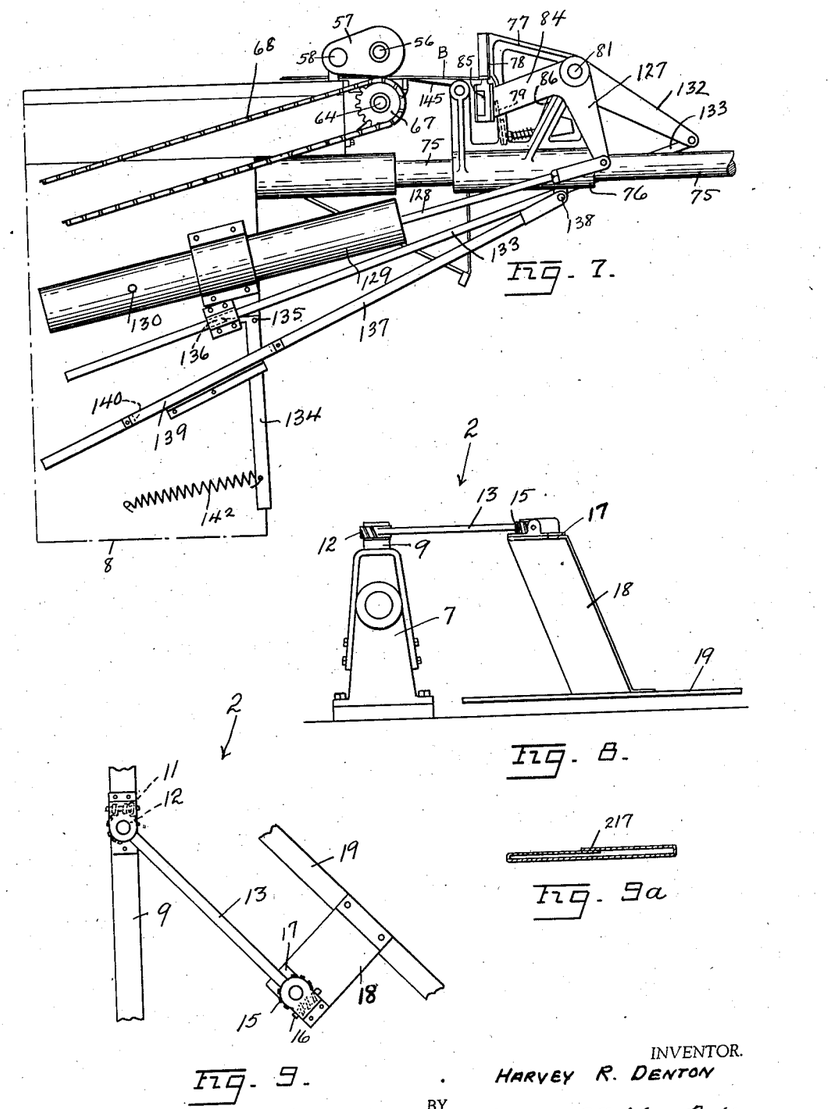
Fig. 7 is an enlarged elevational view of a portion of the machine as seen from arrow A of Fig. 1.
Fig. 8 is an elevational view of one of two identical elements making up the sheet folder.
Fig. 9 is a plan view of the element of Fig. 8.
Fig. 9a is a sectional view through one type of bag made by the machine.

Referring to Figs. 7, 12, one of the arms 86 is seen to be one arm of a bell crank, the other arm 132 of such crank being pivotally connected at its outer end to the end of a rod 133. This arm 133 is held releasably against reciprocable movement by one end of an arm 134 that is pivotally mounted at 135 on the machine frame, said end of said arm being releasably engaged in notch 136 in rod 133.

Thus, as the carriage moves outwardly on the bars 75, the knife blade 79 will be swung upwardly to shear the bag material between it and blade 78.

The arm 134 is rocked for releasing the rod 133 by means of a bar 137 that is pivoted at 138 to the bearing 76. This bar 137 extends along one side of arm 134 and has a strap 139 that extends along the other side of the arm 134. A stop 140 connects one end of the strap with bar 137 and when this stop strikes arm 134, the latter is pivoted on pivot 135 to release its end from notch 136. The knife 79 is then quickly swung downward by spring 141 (Fig. 12) that may connect between the arm 86 and bearing 76. Upon return of the carriage to its normal starting position, the notch 136 will again be positioned for engagement with the end of arm 134, the latter being yieldably returned to its original position by spring 142 (Fig. 7).

It is pertinent to note that the cutter blade 79 will be yieldably moved through its cutting stroke upon engaging the bag material by means of a spring 143 that connects between arm 132 and an arm 144 on the block 89.

During the outward movement of the carriage on bars 75 it will be seen that the bag material between the rollers 55, 62 and the carriage would be unsupported were it not for parallel cords 145 (Figs. 4, 5) that extend over cross bar 146 from their points of attachment to the bed 147 of the machine extending along said rollers. The said cords are held taut between said bed and cross bar 146 by a counterweight member 148 that is pivotally connected to the frame of the machine by means of a rod 149 extending from the member to the frame.

*Modified form of cutter (Fig. 13)*

In this form of device there are two anvils 150, 151 spaced apart but carried by frame 77 of the carriage. The stationary cutting blade 152 and guides 153 are alongside anvil 151 and the crank arms 84 carry two heating bars 154, 155, one for each anvil while the movable cutter blade 156 moves between the heating bars and anvils to cut the bag material that is adapted to pass between the knives.

The mechanism for actuating the sealing bars and cutting knife is the same as already described for the device that is generally designated 4 in Fig. 1.

This modification may be used where it is desirable to seal the opposed sides of the bag material at both sides of the cutting blades. When bag material is secured together as in Fig. 19, such sealing is desirable. The left hand side of the bag material will then be open, while side edges are sealed.

Figure 25:
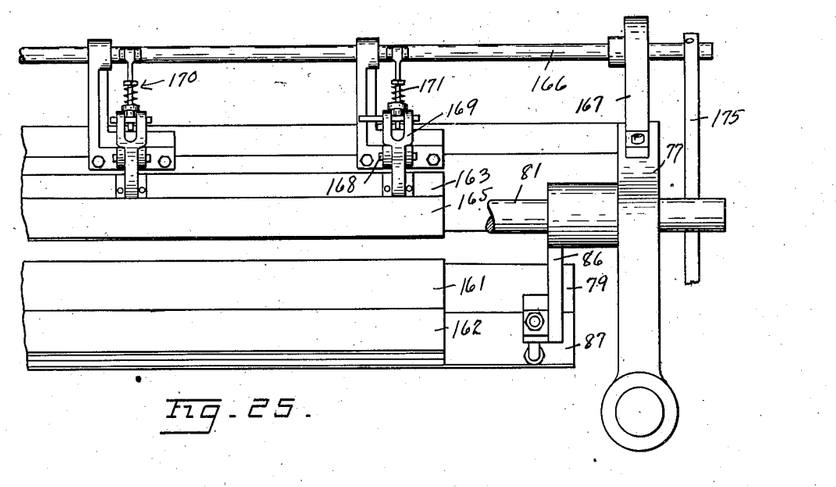
Fig. 25 is a fragmentary elevational view of part of a different form of cutter and sealer than that of Fig. 5 and which is preferable in most instances for providing a better seal.
Figures 26, 27:
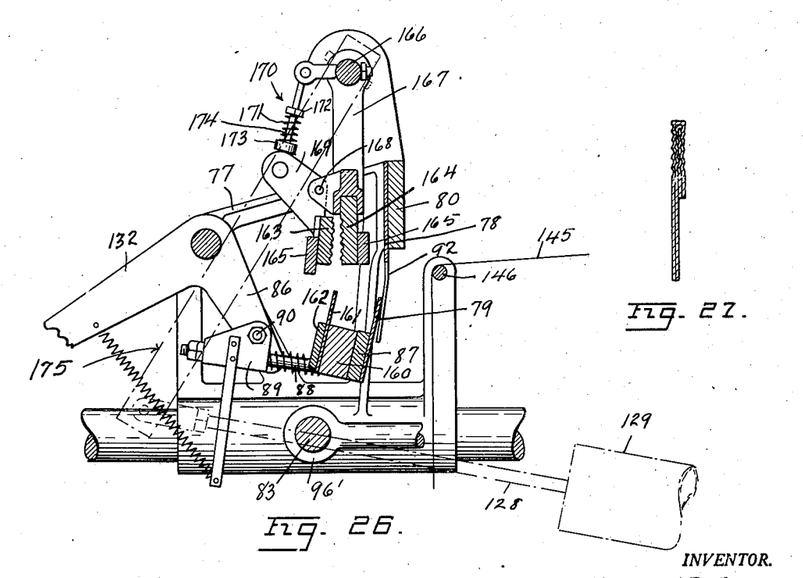
Fig. 26 is a fragmentary sectional view taken through Fig. 25.
Fig. 27 is a fragmentary sectional view through a sealed end of a bag that is formed by operation of the cutter and sealer of Figs. 25, 26.

*The modified cutting and sealing device of Figs. 25, 26*

This form of cutter and sealer provides for an extremely strong seal. The cutter is practically identical with that of Fig. 12 and the same numbers will be used for parts thereof that are the same.

The frame 77, bar 80, crank arms 86, 132, block 89, pivot 90, blade 79, guides 92 and reinforcing bar 87 are the same in Fig. 12 as in Figs. 25, 26. However, secured to bar 87 is a bar 160 parallel therewith, and a folding plate 161 of about the same width as knife 79, is secured alongside bar 160. There is a reinforcing plate 162 alongside blade 161 and the rods 88 identical with rods 88 of Fig. 12 support the assembled bars 87, 160 and plates 161 and 162 for movement the same as has already been described for blade 87.

The sealer of Fig. 26 is above the folding blade 161 and comprises a pair of spaced opposed bars 163, 164 extending generally parallel with blade 161 and having their opposed surfaces grooved so that the lands on one bar will fit in the grooves in the other and vice versa, upon movement of the bars together.

Either the bars 163, or 164, or both, may be electrically heated in the conventional manner by heating units 165 that are carried thereby.

The bar 164 is stationarily held on frame members 77, while above said bar is a cross rod 166 rotatable in uprights 167 carried by said bar 164.

The bar 163 is swingable on pivots 168 toward and away from bar 164, and arms 169 extending generally laterally from bar 163 are connected by a link assembly 170 with the rod 166 for movement with the rod when the latter is rotated to swing bar 163 toward and substantially against bar 164. There is a yieldable joint in the link assembly 170 that includes spring 171 that reacts between collars 172, 173 for yieldably urging a reciprocable section 174 of the link into engagement with the arms 169 respectively.

Arms 175 are secured at one of their ends to rod 166 and the opposite ends of said rod are connected with the piston rods 128 already described in connection with the sealer of Fig. 5.

When the bag material passes between blades 78, 79, and over folding blade, or tucker blade 161 and the carriage is moved outwardly on its rods 75, the knife 79 cuts the material and immediately thereafter the tucker blade moves one end of the bag material between sealing bars 163, 164, folding said end on itself, after which the tucker blade moves from between the sealing bars and the end of the material that is folded on itself is sealed together and corrugated, as illustrated in Fig. 27. The same apparatus that is used in Fig. 7 for actuating the cutter blade also actuates the cutter and tucker of Fig. 26, it being understood that the tucker need not necessarily be completely withdrawn from between the sealing bars before they close, since the yieldable link assemblies connecting bar 163 with rod 166 will permit the withdrawal of the tucker blade without sticking of the same and without dislodging the folded over end of the bag material.

*The slip sheet feed and cutter 6*

This device is not always necessary, but where it is desirable to use a slip sheet between opposed sides of the bags that are formed, it is needed.

Figure 14:
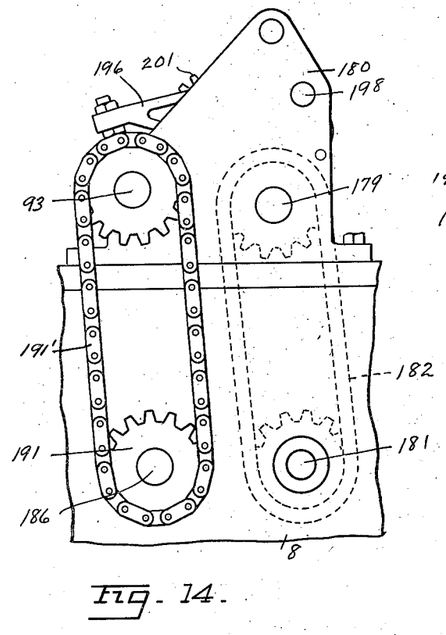
Fig. 14 is a fragmentary elevational view of the slip-sheet cutter device showing the cutter and feed mechanism.
Figure 15:
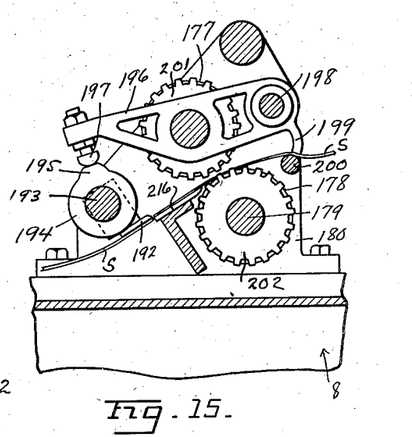
Fig. 15 is an enlarged sectional view of a portion of the machine as seen from line 15—15 of Fig. 2.
Figures 16, 18, 19:
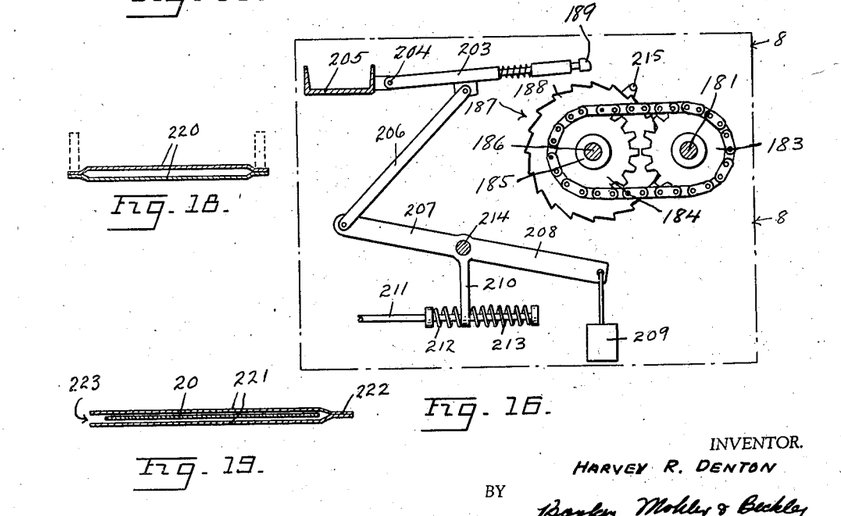
Fig. 16 is a fragmentary part sectional, part elevational view of the mechanism associated with the device of Figs. 14, 15.
Figs. 17, 18, 19 are sectional views through several different forms of bags produced by the machine in which several strips of material are sealed together to form the bag, Fig. 17 showing a multi-walled bag.

This device as best indicated in Figs. 14, 15, 16, comprises an upper roller 177, and a lower roller 178 adapted to be engaged thereby. The lower roller 178 is the drive roller and is on a shaft 179 that is rotatable in frame members 180 at its ends. One end of shaft 179 carries a sprocket wheel that is connected with a sprocket wheel on shaft 181 by a chain 182 (Fig. 14).

Shaft 181 also carries a sprocket 183 that is connected with a sprocket 184 (Fig. 16), the latter being secured on a hollow shaft 185 that is on a cross shaft 186. Shaft 186 is rotatable in bearings carried by the side frame member of the machine, as is shaft 181.

The same type of clutch mechanism, generally designated 187, including a ratchet wheel 188 and a stop pawl 189 is here used as has already been described with respect to clutch mechanism 108.

The stoppage of ratchet wheel 188 of said clutch mechanism by pawl 189 will engage the gear 184 with shaft 186 for driving of the latter by said gear 183, but when said pawl releases the ratchet wheel, the gears 183 and 184 freely rotate disengaged from shaft 186. The shaft 181 also carries a sprocket gear at one of its ends that is connected by a chain 190 with a similar sprocket wheel on drive shaft 70 (Fig. 2).

The shaft 186 carries a sprocket wheel 191 that is connected by chain 191' with a sprocket in the end of shaft 193 that carries a rotary cutter 192. Shaft 193 is carried on frame members 180, and said shaft also carries a cam 194 having a high side 195 (Figs. 14, 15).

The upper roller 177 is rotatably supported at its ends in arms 196, at least one or both of which may carry a cam follower 197 at one end thereof, said follower being positioned to ride on the peripheral surface of cam 194. The opposite ends of arms 196 are pivotally carried by frame members 180 on cross bar 198 that extends between said members. The roller 177 is between said follower 197 and said cross bar 198.

On the end of each arm 196 that is adjacent the cross bar 198 is a generally downwardly projecting finger 199, and below the outer and lower ends of said fingers is a cross rod 200 that is adapted to be engaged by said fingers when the high side of cam 194 is uppermost and moves the follower 197 upwardly and the arms 196 and roller 177 will be moved upwardly at the same time.

At one or both of the ends of rollers 177, 178 are gears 201, 202 that mesh with each other when roller 177 is at the lowermost end of its stroke and in substantial engagement with the roller 178. Thus roller 178, being positively driven, will drive roller 177. However, upward movement of roller 177 by reason of cam 194 will not only separate rollers 177, 178 but will move the gears 201, 202 out of mesh with each other.

Figure 10:
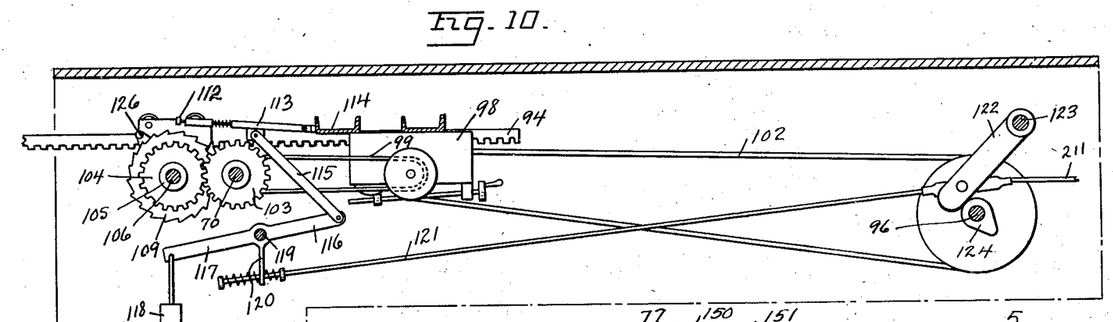
Fig. 10 is a part sectional and part elevational view of a portion of the machine as seen from line 10—10 of Fig. 6.

As has already been described, the roller 178 is driven constantly by its chain sprocket connection with shaft 181 (Fig. 14) but the cam shaft 193 is only rotated when pawl 189 stops rotation of ratchet wheel 188 thereby making a positive driving connection between hollow shaft 185 and shaft 186 through the conventional differential gears in the housing adjacent the ratchet wheel, which arrangement is identical with the clutch mechanism 108 in Figs. 6, 10.

The pawl 189 is yieldable on the outer end of arm 203 (Fig. 16) which arm is pivoted at 204 to a cross frame member 205. A link 206 is pivoted at one end to arm 203 at a point intermediate the opposite ends of the latter, while the opposite end of arm 206 is pivotally connected to one end of arm 207. Arm 207 is one of the head arms of a generally T-shaped crank element, the other arm 208 of the head carrying a counterweight 209, while the depending leg 210 of the T-crank is yieldably connected with one end of a generally horizontally extending rod 211, said end being slidable through the outer end of leg with springs 212, 213 being held on said rod at opposite sides of said leg for yieldably holding the rod between said springs. The T-crank is pivotally supported on the machine at about the juncture between the arms and leg thereof as indicated at 214.

The opposite end of rod 211 is seen in Fig. 10 where it is pivotally connected to the link 122 that rides on cam 124. Thus upon each revolution of shaft 96 which carries the cam 124, the rod 211 will be generally oscillated and reciprocated, and this movement being transmitted to pawl 189 (Fig. 16) will lower the pawl into engagement with the teeth of ratchet wheel 188 stopping the latter.

The release of pawl 189 and subsequent stoppage of rotation of the cam shaft 193 and cam 194 in the position indicated in Fig. 15 is caused by the arm 215 that is carried on shaft 186.

This arm will engage the pawl 189 at each revolution of shaft 186 and consequently, at each revolution of arm 215, and will free the pawl for restoring it to its elevated position shown in Fig. 16.

As the slip sheet material S (Fig. 15) passes between cross bar 200 and fingers 199, and then between rollers 177, 178, and finally between the rotary knife 192 and stationary blade 216 adjacent thereto, it will be seen that with each separation of rollers 177, 178 the slip sheet will be gripped between fingers 199 and cross bar 200 and the rollers will not drive the sheet. Also, the knife 192 at that time will have just completed cutting the sheet S therebetween so that the portion of said slip sheet ahead of the knife or in a direction toward the sealers 3, will be carried away between the opposed sides of the bag material B as the latter is continuously moved over the bed of the machine.

Actuation of the knife and cam 194 for lowering roller 177 and for releasing the fingers 199 through the action of cam 124 will occur when the gap between the cut portion of the slip sheet and the remainder is such as to permit sufficient space for sealing by the sealing bar 85 (on carriage 4) or of bars 163, 160 (Fig. 26), or 154, 155 (Fig. 13), as the case may be.

The fact that the clutch mechanisms 108 and 187 are actuated from the same cam shaft 96 insures synchronism between the spacing of the cut portions of the slip sheet S at the head of the machine and the cutting and sealing of the bag material B at the foot of the machine.

Different types of bags made by machine

In Figs. 9a, 17, 18, 19 are shown only four types of bags, which constitute only a fraction of the number the machine is capable of making.

Bags formed from folding as illustrated in Fig. 9a, are obviously folded from a single sheet of bag forming material with a center seal at 217 along one of the two opposed sides of the bag. Ordinarily the bag material in the rolls has a maximum width, hence if such maximum width were used in making the bag of Fig. 9a, it is obvious that the width of the bag is about one-half of the width of the sheet.

In Fig. 17 one method of forming a single or multiple walled bag is shown in which a plurality of sheets 218 are folded over at their marginal portions to interleaved relation with top sheets 219. By adjusting the sealing devices 3 (Fig. 1) or bars 49 (Fig. 24) to ride over the interleaved marginal portions of sheets 218, 219, the said marginal portions are sealed together tightly. The sealing and cutting devices as shown in Figs. 12, 26 will function to cut the sealed and folded sheets transversely thereof and to seal one end of the sections so cut. Of course bags may be single sided or may have any number of sides without altering the machine other than for supplying the required number of rolls of material at the head of the machine.

Assuming the sides 218 of the bag of Fig. 17 is the maximum width of the bag material, it will be seen that a much wider bag can be produced than by the folding of a single sheet as seen in Fig. 9a.

In Fig. 18 the opposite sides 220 of the bags are separate unfolded sheets sealed directly together along their corresponding marginal portions. With this arrangement, even larger bags can be formed than by the method used in making the bags shown in Fig. 17, since each sheet remains substantially its full width. No folders 14 are required in producing bags by this method since the sheets are not folded.

In Fig. 18 sheets 221 are shown at opposite sides of plate 20, which sheets may be sealed along one edge only as at 222 leaving the opposite side edges open. As already described, the sealer and cutting device of Fig. 13 is particularly suitable for use with this type of bag since the open side 223 will remain open while the ends where the material is cut transversely by blade 156 will be sealed at opposite sides of the cut by sealing bars 154, 155.

Needless to say, many other arrangements can be made, such as a multiple walled bag generally folded as in Fig. 9a with all overlapped edges being along the cutter of one side of such bag, or with the sheet forming each wall being overlapped along lines offset from the overlapping edges of the adjacent sheets. Also the sheets 218 of Fig. 17 may be of different widths while the sheets 219 are of varying widths to overlap the overfolded margins of sheets 219 along lines offset from each other. Whatever type and structure of envelope type bag is to be made, the machine of this invention is capable of producing it.

The illustrations and description herein are not to be considered restrictive of the invention since they are merely illustrative.

Referring to Fig. 1, in those instances where the bag material is not folded in making the bags the bag forming material that moves over the top of plate 20 (Fig. 19) or the top sheet 220 (Fig. 18) or plurality thereof, may be supported on the machine ahead of the position of posts 22 on the machine as indicated in dotted line (Fig. 1) at 230, the rolls 231 being carried on such posts.

I claim:

1. In a bag forming machine of the character described having a frame and a plate thereon for slidably supporting a flattened tubular strip of thin, flexible paper-like material thereon for movement longitudinally thereof from one end of such plate; including a pair of power driven rollers between which said strip is tightly engaged; a carriage adjacent said rollers spaced from said one end of said plate and reciprocably supported on said frame in the path of said strip for reciprocation longitudinally of said strip; a pair of relatively movable cutting blades on said carriage movable therewith and between which said strip is adapted to be moved for transverse cutting of the latter upon actuation of said blades; means for actuating said blades during movement of said strip and during movement of said carriage in the direction of travel of said strip; means for moving said carriage and said knife at the same rate of speed as said strip; means for moving such strip from said plate and between said cutting blades at a predetermined rate of speed equal to the speed of movement of said carriage and knife.

2. A machine of the character described including a frame and a form member thereon for supporting a flat tubular strip of paper-like bag material for movement longitudinally thereof and from one end of said form; a carriage adjacent said one end supported for reciprocatory movement toward and away from said member; a cutter and sealer supported on said carriage and in the path of said strip upon said movement of the strip for intermittently cutting off the advancing end portion of said strip and sealing its opposed sides together along the line of cut; means for moving said strip at a predetermined rate of speed; means for moving said carriage in the direction of movement of said strip at substantially the same rate of speed as that of the latter; means for actuating said cutter and sealer during said last mentioned movement of said carriage for so cutting and sealing the material of said strip.

3. A machine of the character described including a frame and a form member thereon for supporting a flat tubular strip of paper-like bag material for movement longitudinally thereof and from one end of said form; a carriage adjacent said one end supported for reciprocatory movement toward and away from said member; a cutter and sealer supported on said carriage and in the path of said strip upon said movement of the strip for intermittently cutting off the advancing end portion of said strip and sealing its opposed sides together along the line of cut; means for moving said strip at a predetermined rate of speed; means for moving said carriage in the direction of movement of said strip at substantially the same rate of speed as that of the latter; means for actuating said cutter and sealer during said last mentioned movement of said carriage for so cutting and sealing the material of said strip; said cutter comprising a pair of relatively movable blades extending transversely of the direction of movement of said strip; said strip being of material adapted to be heat-sealed, and said sealer being a pair of relatively movable bars alongside said blades; means for heating one of said bars.

4. A machine of the character described including a frame and a form member thereon for supporting a flat tubular strip of paper-like bag material for movement longitudinally thereof and from one end of said form; a carriage adjacent said one end supported for reciprocatory movement toward and away from said member; a cutter and sealer supported on said carriage and in the path of said strip upon said movement of the strip for intermittently cutting off the advancing end portion of said strip and sealing its opposed sides together along the line of cut; means for moving said strip at a predetermined rate of speed; means for moving said carriage in the direction of movement of said strip at substantially the same rate of speed as that of the latter; means for actuating said cutter and sealer during said last mentioned movement of said carriage for so cutting and sealing the material of said strip; means for feeding flat strip material to said plate for movement thereover; means adjacent the opposite end of said plate for folding such material about said form member during said movement of the strip longitudinally thereof; and sealing devices adjacent said form member for sealing the longitudinally extending marginal portions of the folded strip together for forming said tubular strip on said form member.

5. A machine of the character described including a frame and a form member thereon for supporting a flat tubular strip of paper-like bag material for movement in a path longitudinally thereof and from one end of said form; a carriage adjacent said one end supported for reciprocatory movement toward and away from said member; a cutter and sealer swingingly supported on said carriage for cutting said strip transversely thereof during said movement of the latter; a rack and gear drive connected with said carriage for intermittently moving the latter in the direction of movement of said strip upon intermittent rotation of said gear and a spring for returning said carriage toward said member; cranks connected with said cutter and sealer; means connecting one of the arms of said cranks respectively to said frame for so swinging said cutter and sealer upon said movement of said carriage away from said member when said gear is actuated; and means for intermittently actuating said gear.

6. A machine of the character described, including a frame and a form member thereon for supporting a flat tubular strip of paper-like bag material for movement in a path longitudinally thereof and from one end of said form; a carriage adjacent said one end supported for reciprocatory movement toward and away from said member; a cutter and sealer swingingly supported on said carriage for cutting said strip transversely thereof during said movement of the latter; a rack and rear drive connected with said carriage for intermittently moving the latter in the direction of movement of said strip upon intermittent rotation of said gear and a spring for returning said carriage toward said member; cranks connected with said cutter and sealer; means connecting one of the arms of said cranks respectively to said frame for so swinging said cutter and sealer upon said movement of said carriage away from said member when said gear is actuated; means for intermittently actuating said gear; drive rollers engaging said strip for movement continuously at a predetermined rate of speed; and the said gear being actuated by said last mentioned means at a rate of speed for moving said carriage at the same rate of speed as that of said strip; and means for varying the period of time between the intermittent actuations of said gear by said last mentioned means.

7. In a machine of the character described, including a frame and a form member thereon for supporting a flat tubular strip of paper-like bag material for movement in a path longitudinally thereof and from one end of said form; means for supporting a roll of slip-sheet material adjacent the opposite end of said form for movement of the latter with the tubular strip between its opposed sides; a carriage adjacent said one end supported for reciprocatory movement toward and away from said member; a sealer on said carriage extending transversely of said path actuatable for sealing together the opposed sides of said tubular strip; means for continuously moving said tubular sheet along said path; means for intermittently moving said slip-sheet material into said tubular strip; a cutter for transversely cutting off the section of slip-sheet material so moved into said tubular strip; means for actuating said sealer and said cutter in synchronism for sealing said opposed sides between each section of slip-sheet material so cut from the roll thereof.

8. In a machine of the character described, including a frame and a form member thereon for supporting a flat tubular strip of paper-like bag material for movement in a path longitudinally thereof and from one end of said form; means for supporting a roll of slip-sheet material adjacent the opposite end of said form for movement of the latter with the tubular strip between its opposed sides; a carriage adjacent said one end supported for reciprocatory movement toward and away from said member; a sealer on said carriage extending transversely of said path actuatable for sealing together the opposed sides of said tubular strip; means for continuously moving said tubular sheet along said path; means for intermittently moving said slip-sheet material into said tubular strip; a cutter for transversely cutting off the section of slip-sheet material so moved into said tubular strip; means for actuating said sealer and said cutter in synchronism for sealing said opposed sides between each section of slip-sheet material so cut from the roll thereof; a second cutter adjacent said sealer actuatable for cutting said tubular strip transversely thereof between each such section of said slip-sheet; and means for so actuating said last mentioned second cutter.

HARVEY R. DENTON.

REFERENCES CITED

The following references are of record in the file of this patent:

UNITED STATES PATENTS

| Number | Name | Date |
|---|---|---|
| 946,224 | Huffman | Jan. 11, 1910 |
| 506,798 | Scott | Oct. 17, 1893 |
| 2,140,599 | Salfisberg | Dec. 20, 1938 |
| 2,205,005 | Anderson | June 18, 1940 |
| 2,275,976 | Meade | Mar. 10, 1942 |
| 2,125,758 | Waters | Aug. 2, 1938 |
| 2,169,936 | Wagner | Aug. 15, 1939 |
| 2,217,924 | Stern | Oct. 15, 1940 |
| 2,087,444 | Potdevin | July 20, 1937 |
| 1,990,892 | Becker et al. | Feb. 12, 1935 |
| 2,147,856 | Novick | Feb. 21, 1939 |
| 2,325,431 | Shippy | July 27, 1943 |